INVENTORS R. G. TREUTING
J. H. WERNICK
BY
ATTORNEY

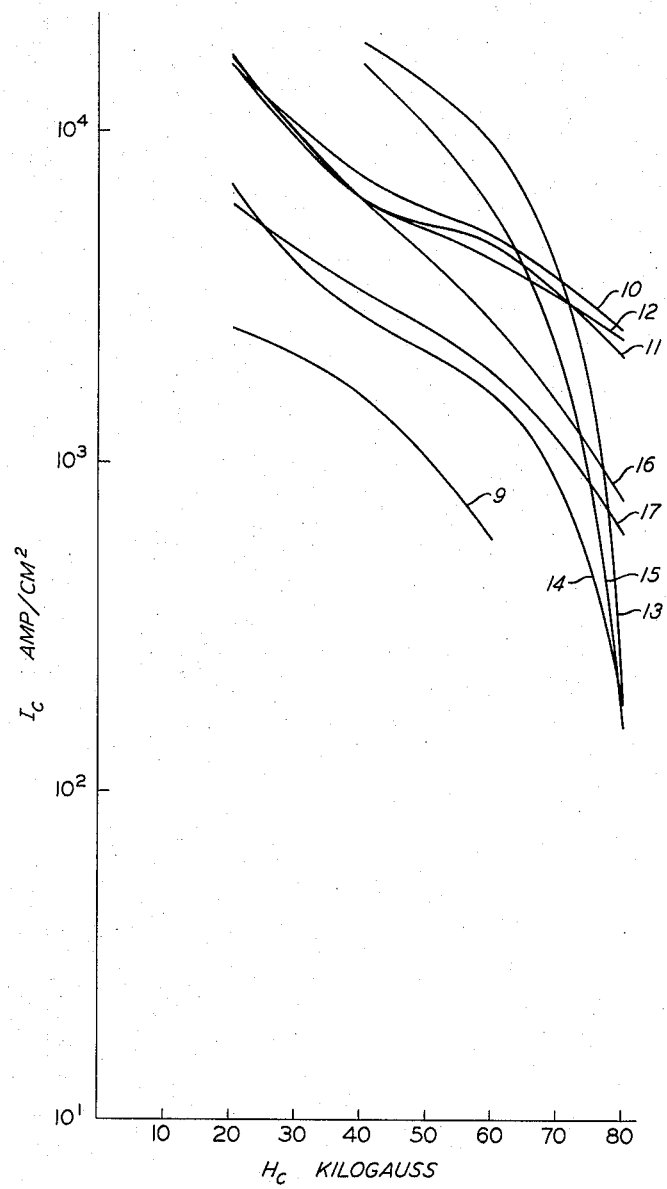

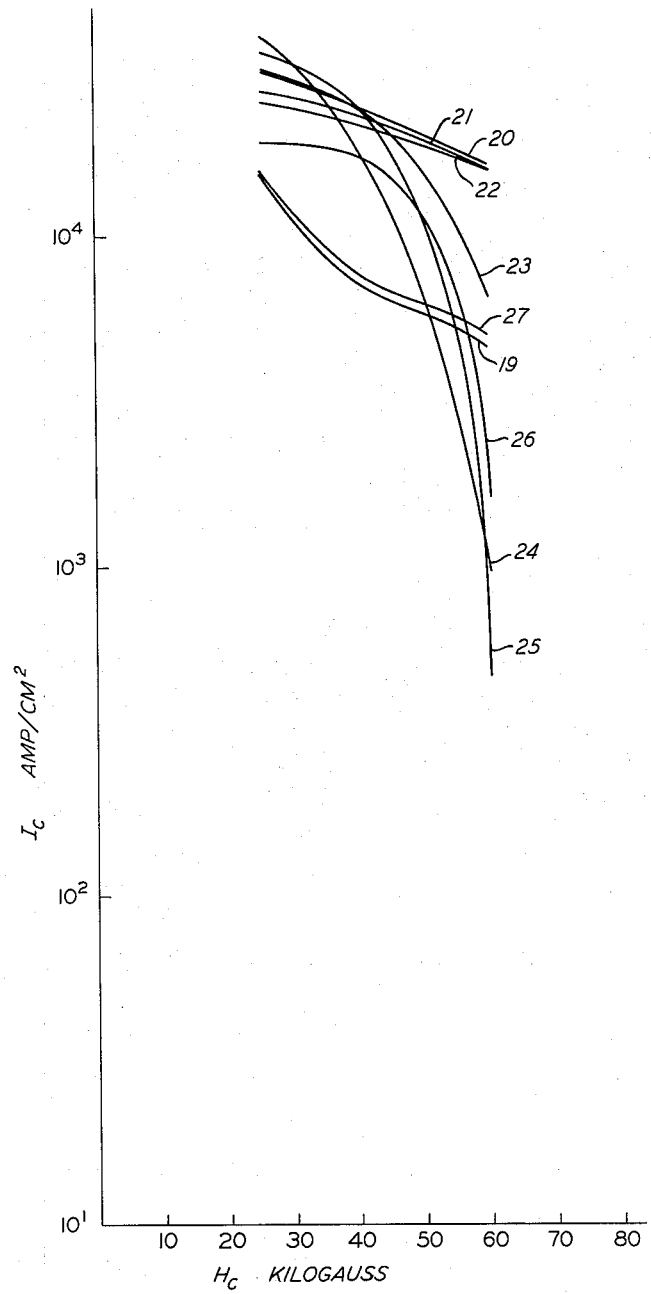

3,253,191
Nb-Zr SUPERCONDUCTOR AND PROCESS OF
MAKING THE SAME
Robert G. Treuting, Chatham Township, Morris County,
and Jack H. Wernick, Morristown, N.J., assignors to
Bell Telephone Laboratories, Incorporated, New York,
N.Y., a corporation of New York
Filed Oct. 11, 1961, Ser. No. 144,454
7 Claims. (Cl. 317—158)

This invention relates to methods for improving the hard superconducting properties of alloys of the Nb-Zr system, to material so produced, and to devices including elements of this material.

United States patent application Serial Number 104,991, filed April 24, 1961, describes the superconducting properties of the Nb-Zr alloy system. This system is of immediate consequence to workers skilled in the art since it evidences the best superconducting properties of the ductile materials thus far investigated. Although its maximum critical field value is of the order of only about 100 K gauss at the usual operating temperatures, as compared with a value two or three times that for $Nb_3Sn$, the mechanical properties of the former material permit it to be readily fabricated into workable forms such as the usual wire configurations now of interest for superconducting magnet solenoids.

It has been reported that alloys of the Nb-Zr system manifest "soft" characteristics; that is to say, the material as cast and before working has a value of maximum or critical current $I_c$ for a given value of critical field $H_c$ which scales approximately as the perimeter of a cross section of the body normal to the direction of current flow. It has been observed in this system, as in most others, that the superconducting properties can be modified by cold working so as to result in "hard" characteristics; that is, a condition such that the current-carrying capacity of a given body scales to a power greater than the first order of the diameter of the body, assuming circular cross section, or generally is proportional to a value approaching the cross sectional area on a plane normal to current flow.

It has been observed in alloys of the Nb-Zr system that cold rolling, swaging, or other cold working in this manner results in greatly increased values of $I_c$ as well as some improvement in $H_c$. It has been observed in all superconductive materials amenable to working that the realized improvement increases with increasing working. It is recognized, too, that the cold-working procedure is self-limiting. Although working to reductions of the order of 99 percent and greater results in increasing improvement, such treatment often has the concomitant effect of embrittlement. While it is recognized in the art that further reduction may be brought about by intervening annealings, it is recognized, too, and it has been observed in the superconductor technology, that such heat treatment relaxes strain in the material and results in loss of the improvement realized by working.

In accordance with this invention, it has been discovered that heat treatment of Nb-Zr alloys over certain critical stated temperature ranges results in an improvement in superconducting properties. It is found that this observed improvement is a direct consequence of the phase dissociation or precipitation hardening mechanism recognized in the metallurgical field. It is uniformly found that such improvement is brought about only at temperatures below the maximum at which the coexistence of two or more crystalline phases is permitted.

It has been found that, although the improvement in Nb-Zr alloys in accordance with the mechanisms employed in this invention is related to the improvement brought about by cold working, certain important differences exist. As will be seen from the data presented herein, improvement brought about by the processes here set forth, although generally effective over the whole applied magnetic field range for any of the concerned alloys, is perhaps more pronounced for the lower range of applied fields, that is, fields below of the order of about 50 K gauss, although significant improvement may result beyond this value. Compared to this improvement brought about by the local strains resulting from heat treatment, gross strain introduced by cold working appears to have its chief effect over higher ranges of applied field, although again significant improvement is realized for all values of applied field. This indication that the strain-inducing mechanisms are distinct is borne out by the important observation that materials manifesting improved properties brought about by cold working are further significantly improved by heat treatment in accordance with this invention and vice-versa. In fact, as is described herein, successive working, heat treatment, and working result in materials having a current-carrying capacity appreciably greater than that of materials given a lesser number of treatments. This latter finding holds for fields beyond which improvement is not observed after heat treatment alone.

Description of the invention is facilitated by the following conventions:

1. For the purpose of this description, Nb-Zr alloys of interest are those between the limiting compositions 10 percent Nb-90 percent Zr, and 90 percent Nb-10 percent Zr, both on an atomic scale, although, as will be seen, a preferred limiting composition is dicated by the low Zr composition on the monotectoid transition line of the binary diagram so dictating a preferred composition range of from about 12.5 atomic percent Zr to 90 atomic percent Zr. Reference to Nb-Zr is intended to encompass the entire broad range unless indicated otherwise.

2. The symbol $H_c$ is not intended to be limited to its strict meaning of maximum or zero current field for a given temperature but is intended to have reference to a maximum field value corresponding with a given current for such temperature. The symbol $I_c$ correspondingly has reference to the maximum current-carrying capacity for a given field. The symbol $T_c$, critical temperature, is used in its conventional sense of maximum transition temperature, corresponding with zero field and zero current.

3. Where reference is made to hardening brought about by heat treatment, this terminology is to be understood to include both dissociation hardening, in which a phase other than the pure high temperature $\beta$ phase is produced by reaction in the solid material, as well as precipitation hardening, in which such additional phase results or is increased in amount by precipitation from solid solution. The maximum temperature suitable for heat treatment of a given composition in accordance with these processes is the temperature of the intercept of the compositional vertical and the phase lines bounding the lower temperature portion of the pure high temperature $\beta$ phase. As is seen from the phase diagram herein, treated material may include two or more of the $\beta$-Zr, $\beta$-Nb, and $\alpha$-Zr phases. Since it is essential to this invention that the heat treatment schedule result in strain, it is understood that the conditions must be such as to result in a retention of phases, either in amount or kind not ordinarily present at room temperature. Phase dissociation and precipitation hardening are both procedures well known to metallurgists, and in terms of that art it will be understood that heat treatment is to be followed by quenching or otherwise by sufficiently rapid cooling to result in the stated condition.

4. Where reference is had to cold working, it is to be understood that this procedure, too, is carried out in such manner as to result in the retention of strain at room temperature. For these purposes, such working is considered sufficient if it results in a minimum of about 60 percent reduction based on the usual relationship:

$$\frac{\text{Original cross-sectional area} - \text{final cross-sectional area}}{\text{Original cross-sectional area}} \times 100\%$$

Reference is made to the drawing, in which:

FIG. 1, on coordinates of temperature in degrees centigrade and amount Zr in the dual abscissa units of weight percent and atomic percent, is a conventional binary diagram for the system Nb-Zr;

FIG. 2, on coordinates of log $I_c$ in amperes per square centimeter versus $H_c$ in kilogauss, is a plot of these values for a sample of Nb-Zr which has been successively cold worked, heat treated, and cold worked;

FIG. 3, on the same coordinates, is a plot showing the relationship between $I_c$ and $H_c$ for a different Nb-Zr composition for various indicated conditions of heat treatment;

FIG. 4 is a similar plot for a different Nb-Zr composition; and

Figure 1:
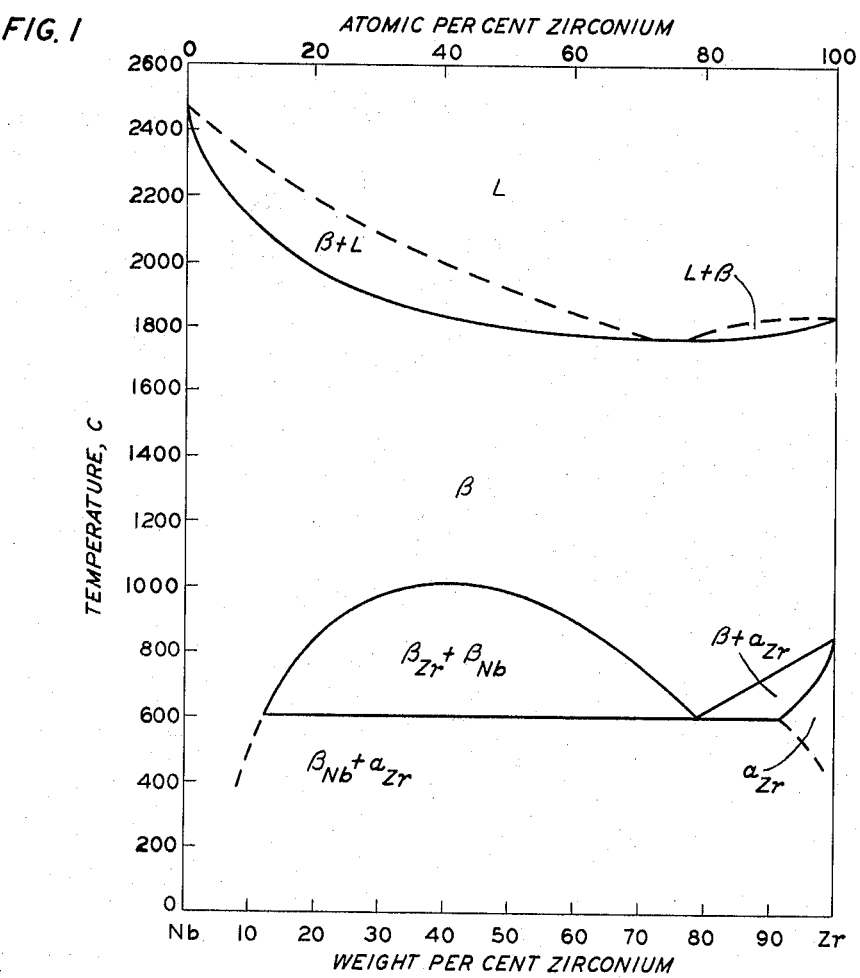

Referring again to FIG. 1, the binary diagram for the Nb-Zr system shows a complete solid solubility $\beta$-phase material above about 1000 degrees centigrade for a composition of about 40 atomic percent Zr, a low limit on pure high temperature $\beta$-phase material at the monotectoid point occurring at approximately 610 degrees centigrade, and about 83 atomic percent Zr, with other compositions evidencing intermediate temperatures bounding the lower end of the pure $\beta$ phase. The horizontal at about 610 degrees centigrade extends from about 12.5 to over 90 atomic percent Zr and so, when combined with the compositional range of interest in the Nb-Zr system, results in a preferred range of from 12.5 to 90 atomic percent Zr, which defines the compositional range over which the desired phase dissociation hardening of this invention is permitted. As described above, precipitation hardening alone, although not preferred in accordance with this invention, permits improvement of superconducting characteristics by heat treatment over the compositional range from 10 to 12.5 atomic percent Zr, so making possible the treatment of the entire broad range of compositions above set forth. It has been observed that improvement in superconducting properties may be brought about by operation at any temperature below the lower temperature limit of the pure high temperature $\beta$ phase. Such improvement has been realized both by temperatures above the monotectoid horizontal, as in the $\beta$-Zr plus $\beta$-Nb region, as well as by the use of temperatures below 610 degrees centigrade, in the $\alpha$-Zr plus $\beta$-Nb region.

Broadly, the teachings of this invention will be construed by persons skilled in the art as dictating the use of conditions necessary to bring about the known mechanisms of phase dissociation and/or precipitation hardening, and it is in such terms that this invention is broadly claimed. It is known, too, that there is a certain correspondence between low temperature, long time and high temperature, short time treatment, and further that such strain-producing mechanisms are of diminishing effectiveness as the temperature of treatment is decreased to values approaching room temperature. For the purposes of this invention, a minimum heat treatment temperature of the order of 300 degrees centigrade is preferred. Observations indicate the existence of a still more preferred minimum temperature at about 400 degrees centigrade. Times of heat treatment are considered to be generally within the knowledge of the art based on the results herein reproduced. However, it is generally considered, based on the observed kinetics of the system, that minimum heat treatment periods of the order of thirty minutes are preferred. In similar fashion it will be recognized by those familiar with the heat treatment hardening mechanisms which are the subject of this invention that maximum strain is introduced for incomplete phase dissociation, it having been found that sufficient treatment to result in equilibrium has the effect of reducing strain induced in this fashion to a value below the maximum obtainable. Although persons skilled in the metallurgical art are familiar with this limitation and will consequently work at conditions such as to result in a nonequilibrium phase dissociation, it has been observed that times of the order of appreciably greater than ten hours are insufficient to bring about such limiting condition. As a consequence, for the purposes of this invention it is considered that a ten-hour period is a preferred upper limit on heat treatment time over the entire range of suitable temperatures.

Figure 2:
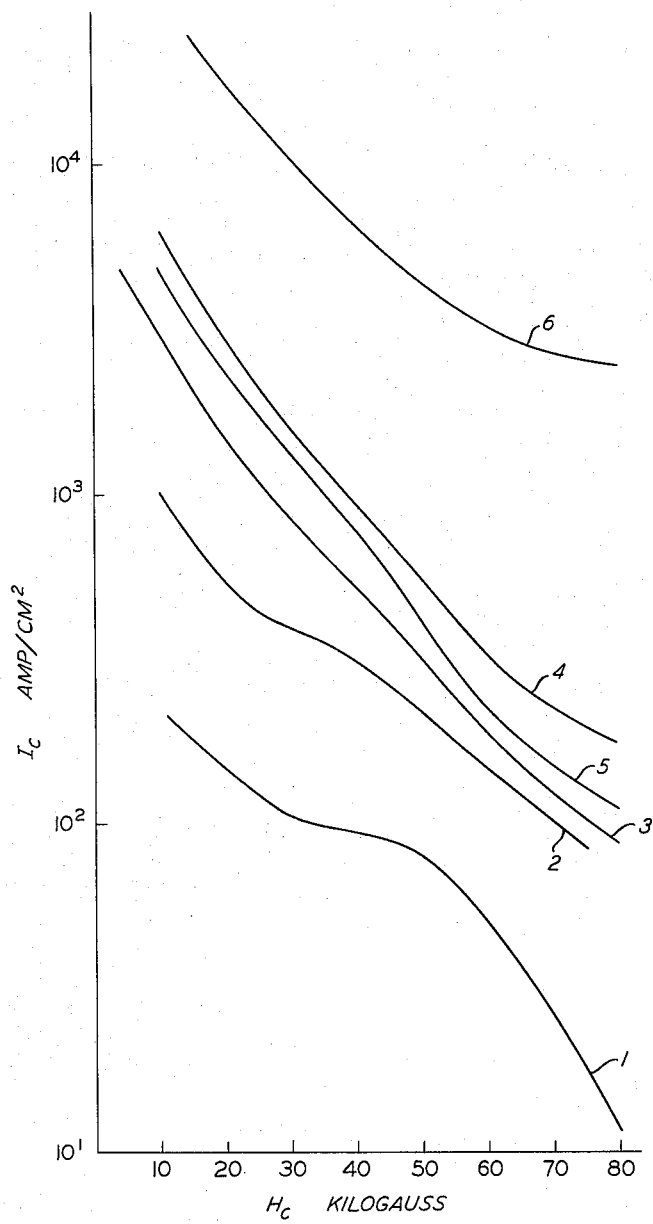

The data set forth on FIG. 2 were taken from measurements made on a sample of a Nb-Zr alloy containing 75 atomic percent Zr and, accordingly, represented as Nb:3Zr. The first curve, designated "1," shows the $H_c$-$I_c$ relationship for a sample of as-cast material. Curve 2 shows the same relationship in the same sample after cold working resulting in 97 percent reduction. It is seen that this cold working has produced an improvement in $I_c$ of the order of one-half an order of magnitude or greater for the entire range of $H_c$ values plotted. Curves 3 and 4 show an improvement in current-carrying capacity realized by heat treatment of separate portions of the same cold-worked specimen at 600 degrees centigrade for periods of two hours and four hours, and curve 5 shows the effect of a further four-hour heat treatment in the portion represented by curve 4, so resulting in a total eight-hour treatment at 600 degrees centigrade. It is seen that further appreciable improvement has resulted, with current-carrying capacity being maximized over the lower range of applied field. Curve 6 represents the final run made on this sample. It illustrates the effect of a further 80 percent reduction by cold working after two hours' treatment (portion represented by curve 3) at 600 degrees centigrade. It is seen that the improvement in current-carrying capacity so brought about is at least as great again as that produced by similar cold working of the as-cast sample, with current-carrying capacity improvement this time being maximized over a higher range of field values. It is seen, therefore, that successive heat treating and cold working are complementary processing steps resulting in approximately uniform improvement in $I_c$ over the entire range of field values.

FIG. 3 shows the effect of heat treatment at various indicated temperatures for a 50—50 atomic percent alloy of the Nb-Zr system. Curves are presented for two-, four-, and eight-hour treatments at 400 degrees centigrade (curves 10, 11, and 12—initial curve 9 is plotted for the sample as drawn and represents in excess of 90 percent cold working), as well as for two-hour treatments at temperatures of 500, 600, 700, 800, and 900 degrees centigrade (curves 13, 14, 15, 16, and 17, respectively). As is expected, the effectiveness of treatment drops off at the highest temperature reported, this value approaching the lower limit of the high temperature $\beta$ region and so resulting in a lesser degree of phase dissociation.

FIG. 4 shows a similar set of curves for a 75–25 atomic percent Nb-Zr alloy designated 3Nb-Zr, with curves 20, 21, and 22 corresponding with two-, four-, and eight-hour treatments at 400 degrees centigrade (curve 19 is plotted for an untreated sample in the as-drawn condition, again in excess of 90 percent cold working); and curves 23, 24, 25, 26, and 27 corresponding, respectively, with two-hour treatments at 500, 600, 700, 800, and 900 degrees centigrade. It is seen from these curves that while heat treatment invariably realized for fields of about 50 K gauss and lower, heat treatment alone, does not invariably result in improvement above this field. This observation, generally observed for other compositions, should not be construed as limiting the invention, it having been observed that subsequent cold working results in over-all improvement for fields above as well as below 50 K gauss.

Figure 5:
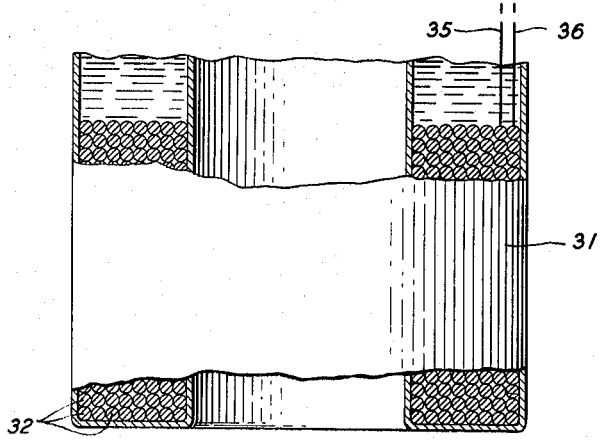
FIG. 5 is a sectional view of a magnetic configuration consisting of an annular cryostat containing several winding of Nb-Zr wire of a composition within the range specified.

In FIG. 5 there is shown an annular cryostat 31 of the approximate dimensions 18″ O.D. and 6″ I.D. by 30″ long, filled with liquid helium and containing 7000 turns per centimeter length of Nb-Zr windings 32. Terminal leads 35 and 36 are shown emerging from the coil. A pumping means, not shown, may be attached to the cryostat so as to permit a temperature variation corresponding with the variation in boiling point of liquid helium at different pressures, the pumping means used in the experimental work described herein permitting regulation of temperature between the values of 1.5 degrees Kelvin and 4.2 degrees Kelvin, corresponding with a pressure range of 3.6 millimeters of mercury to atmospheric pressure.

As is described, the experimental work resulting in the measured values reported herein made use of a direct-current supply source in series with one or more variable resistors. By this means it was possible to vary the current flowing through the superconducting specimen and, by also adjusting the applied field, to so determine the relationship between critical current and applied field. Alternatively, in actual operation, a solenoid structure such as that shown in FIG. 5 may avoid resistance losses and so obviate the need for a continuous direct-current source by using an arrangement for shunting the current. Such arrangements are considered well known in the art, conventional circuits as well as certain novel arrangements all usable in conjunction with the instant invention being described in some length in copending United States application Serial Number 56,748, filed September 19, 1960 (J. E. Kunzler Case 1), now Patent No. 3,129,359, granted April 14, 1964. Each of the two techniques has its advantages. Where the magnetic field is to be varied during operation, it is necessary to use a continuous direct-current source together with a variable resistor or other adjusting means. Where the requirement is for a constant field, optimum efficiency is obtained by use of a shunt. Where extremely high current densities are to be used, it may be unfeasible to use a continuous direct-current source and other exposed circuitry by reason of the large heat losses.

The invention has been described in terms of a limited number of examples. Data presented have been substantiated with additional samples over the Nb-Zr compositional range described. For excellence of results, as well as to attain desired configurations, it is desirable to cold roll or draw the cast sample prior to heat treatment, as it is desirable to cold work again following heat treatment. It is, however, clear, both from the data here included and on the basis of other studies conducted, that heat treatment over the range set forth results in improvements in superconductive properties due to phase dissociation or precipitation hardening regardless of the prior history of the sample, provided of course that it has not already been given a maximizing heat treatment. Improvement of the order described in brought about in samples in their as-cast condition just as in their worked condition. The improvement so resulting is clearly attributable to the dissociation or precipitation mechanism. Diffraction studies made on heat-treated samples which have previously been cold worked indicate that much of the gross strain is removed on heat treatment, although the effect is certainly not that of a "dead" anneal. Much or all of this gross strain is again in evidence after cold working following heat treatment. No theoretical explanation is proposed for the still further improvement resulting from this subsequent cold working. Cooling of samples has generally been brought about merely by turning off the power supply to the apparatus in which heat treatment was carried out. The size of the samples being treated (of the order of 25 mils in a cross-sectional dimension as cast and smaller as worked) is sufficiently small so that the effect is a fairly rapid cool of the order of 50 degrees centigrade per minute down to room temperature. Other types of rapid cooling or quenching are known to those skilled in the art. Any such procedure is suitable, providing cooling is sufficient to result in substantial retention of the phase dissociation resulting on heat treatment. It is considered that a minimum cooling rate of the order of 30 degrees centigrade per minute at least to a temperature of the order of 150 degrees centigrade is so indicated.

Although it is expected that phase dissociation or precipitation hardening will be found to produce local strain which may result in improvement in properties in other superconducting systems, the degree of the effect is associated with the structure of the material and therefore is not predictable on the basis of this invention; and as a consequence these teachings are properly construed as applied to the Nb-Zr system over the compositional range indicated. However, it is well known that small amounts of minor ingredients may be added to bring about desirable changes in characteristics. Such additions of appropriate elements in amounts of the order of five percent by weight or less, do not preclude the dissociation or precipitation mechanism upon which this invention is premised. Accordingly, variations in the compositions recited so as to include such additives are properly considered within the scope of this invention. Reference in the claims to an alloy of the Nb-Zr system is intended to include such variations. The Nb-Zr samples upon which the described studies have been made were produced by arc melting at a temperature and under conditions such as to result in a material evidencing a substantially single-phase high temperature $\beta$ form of the material, and it is upon material evidencing substantially pure $\beta$ form that the invention is desirably practiced. However, the inventive procedures may advantageously be carried out on alloys which do not evidence complete solid solubility but which contain one or more additional phases provided, of course, the temperature of heat treatment is sufficiently removed from the temperature at which the initial material is in its equilibrium state so as to result in hardening. For the purposes of this invention it is considered that the maximum temperature of heat treatment is of the order of 50 degrees centigrade below the temperature at which the material is in its equilibrium state. Preferred operation on a pure $\beta$ phase material is similarly indicated as being carried out at a temperature at least 50 degrees centigrade below the lower boundary of the pure high temperature $\beta$ phase of the binary diagram.

What is claimed is:

1. Method of making a superconducting element comprising heat treating an alloy of the Nb-Zr system within the range 10 percent Nb–90 percent Zr to 90 percent Nb–10 percent Zr, all in atomic units, so as to result in an increase in amount of at least one solid phase, cooling so as to substantially retain the phase distribution effected during heating and forming the resulting alloy into a coil.

2. Method of claim 1 in which the initial material is substantially homogeneous $\beta$ phase and in which heat treatment is carried out at a temperature at least 50 degrees below the phase lines bounding the lower end of the pure $\beta$ phase initial material.

3. Method in accordance with claim 2 in which the material is cold worked subsequent to heat treatment to an extent such as to result in at least a sixty percent reduction.

4. Method in accordance with claim 3 in which the initial material is cold worked prior to heat treatment so as to result in a reduction of at least sixty percent.

5. Method of claim 2 in which the said heat treatment is carried out at a temperature of at least 300 degrees centigrade for a period of from one-half to ten hours, and in which the material is cooled at a rate of at least 30 centigrade per minute subsequent to such treatment.

6. Method of claim 5 in which heat treatment is carried out at a temperature of at least 400 degrees centigrade.

7. A superconducting element consisting essentially of an alloy of the Nb-Zr system within the range 10 percent Nb–90 percent Zr to 90 percent Nb–10 percent Zr, all in atomic units, the said alloy containing in addition to $\beta$NbZr a substantial amount of an additional metallurgical phase, said element including a plurality of convolutions prepared by a process comprising heat treating an alloy of the Nb-Zr system within the range 10 percent Nb–90 percent Zr to 90 percent Nb–10 percent Zr, all in atomic units, so as to result in an increase in amount of at least one solid phase, and cooling so as to substantially retain the phase distribution effected during heating, together with means for maintaining the said element below its superconducting transition temperature.

References Cited by the Examiner

Buck: Proceedings of the IRE, April 1956, pp. 482–493.

Bureaus of Mines Report of Investigations 4658, A Preliminary Survey of Zr-Alloys, March 1950, pp. 19, 20.

Burton: The Phenomenon of Superconductivity, pages 53–58. Page 53 pertinent. Published in 1934 by the University of Toronto Press, Toronto, Canada.

Journal of Metals, vol. 7, pp. 1034–1041, September 1955.

Metallurgy of Zr, Lustman & Kerze, 1955, pp. 465, 467.

Transactions ASM, vol. 47, Preprint No. 37, The Strength of Wrought Zr-base Binary Alloys at 1800–2200 F. (14 pages) 1954.

Von Laue: Theory of Superconductivity, pages 1 and 2. Published in 1952 by Academic Press Inc., Publishers, New York.

Zirconium Miller, 2nd ed., pp. 374, 375, 1957.

WINSTON A. DOUGLAS, *Primary Examiner.*

RAY K. WINDHAM, DAVID L. RECK, *Examiners.*

G. HALL, O. MARJAMA, W. B. NOLL,
*Assistant Examiners.*